United States Patent
Ooba

(10) Patent No.: US 10,703,577 B2
(45) Date of Patent: Jul. 7, 2020

(54) OBJECT CONVEYING SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 77 days.

(21) Appl. No.: 16/205,726

(22) Filed: Nov. 30, 2018

(65) Prior Publication Data

US 2019/0225430 A1 Jul. 25, 2019

(30) Foreign Application Priority Data

Jan. 25, 2018 (JP) .................. 2018-010493

(51) Int. Cl.
| | |
|---|---|
| *B65G 43/00* | (2006.01) |
| *B25J 9/16* | (2006.01) |
| *B25J 9/00* | (2006.01) |
| *G05B 1/00* | (2006.01) |
| *B65G 43/08* | (2006.01) |

(52) U.S. Cl.
CPC ............ *B65G 43/00* (2013.01); *B25J 9/0093* (2013.01); *B25J 9/1697* (2013.01); *B65G 43/08* (2013.01); *B65G 2201/0294* (2013.01); *B65G 2203/0233* (2013.01); *B65G 2203/0291* (2013.01); *B65G 2203/041* (2013.01); *G05B 1/00* (2013.01)

(58) Field of Classification Search
CPC combination set(s) only.
See application file for complete search history.

(56) References Cited

U.S. PATENT DOCUMENTS

| 4,639,878 A | 1/1987 | Day et al. |
|---|---|---|
| 4,654,949 A * | 4/1987 | Pryor ................ A01B 69/008 29/407.04 |

(Continued)

FOREIGN PATENT DOCUMENTS

| CN | 106560297 A | 4/2017 |
|---|---|---|
| CN | 107225569 A | 10/2017 |

(Continued)

OTHER PUBLICATIONS

Japanese Decision to Grant a Patent dated Sep. 24, 2019, in connection with corresponding JP Application No. 2018-010493 (6 pgs., including machine-generated English translation).

*Primary Examiner* — Kyle O Logan

(74) *Attorney, Agent, or Firm* — Maier & Maier, PLLC

(57) ABSTRACT

Provided is an object conveying system including: a conveying apparatus that conveys an object; one or more cameras that capture images of feature points of the object; a position measuring portion that measures positions of the feature points from the acquired images; a detecting portion that detects a position or a movement velocity of the object; a position correcting portion that corrects the positions of the feature points so as to achieve positions at which the feature points are disposed at the same time; a line-of-sight calculating portion that calculates lines of sight that pass through the feature points on the basis of the corrected positions of the feature points and the positions of the cameras; and a position calculating portion that calculates a three-dimensional position of the object by applying a polygon having a known shape to the calculated lines of sight.

6 Claims, 5 Drawing Sheets

(56) References Cited

U.S. PATENT DOCUMENTS

| | | | | |
|---|---|---|---|---|
| 4,669,168 | A * | 6/1987 | Tamura | B25J 9/0093 |
| | | | | 29/429 |
| 4,995,091 | A * | 2/1991 | Shimbara | B07C 5/3422 |
| | | | | 382/272 |
| 5,609,223 | A * | 3/1997 | Iizaka | A47F 9/046 |
| | | | | 186/61 |
| 5,802,202 | A | 9/1998 | Yamada et al. | |
| 7,289,876 | B2 * | 10/2007 | Lussen | B66C 13/085 |
| | | | | 212/275 |
| 2002/0118874 | A1 * | 8/2002 | Chung | G06T 17/10 |
| | | | | 382/154 |
| 2008/0006484 | A1 * | 1/2008 | Lim | B62D 65/18 |
| | | | | 187/244 |
| 2008/0251351 | A1 * | 10/2008 | Powers | B25J 9/0084 |
| | | | | 198/402 |
| 2013/0199893 | A1 * | 8/2013 | Robbin | B05B 13/0221 |
| | | | | 198/463.1 |
| 2017/0095930 | A1 | 4/2017 | Warashina et al. | |
| 2017/0274534 | A1 | 9/2017 | Takahashi et al. | |
| 2018/0284738 | A1 * | 10/2018 | Menke | B62D 65/18 |
| 2018/0370023 | A1 | 12/2018 | Ooba | |
| 2019/0017847 | A1 * | 1/2019 | Han | G05B 19/042 |

FOREIGN PATENT DOCUMENTS

| | | |
|---|---|---|
| EP | 0328687 A1 | 8/1989 |
| JP | S64-051289 A | 2/1989 |
| JP | H06-270083 A | 9/1994 |
| JP | H07-013613 A | 1/1995 |
| JP | H07-229716 A | 8/1995 |
| JP | 2016-032855 A | 3/2016 |
| JP | 2017-134661 A | 8/2017 |
| JP | 2019-005856 A | 1/2019 |

\* cited by examiner

| | DELAY TIME |
|---|---|
| REFERENCE CAMERA 4A | 0 |
| CAMERA 4B | $\Delta t_1$ |
| CAMERA 4C | $\Delta t_2$ |
| ⋮ | ⋮ |

OBJECT CONVEYING SYSTEM

CROSS-REFERENCE TO RELATED APPLICATIONS

This application is based on Japanese Patent Application No. 2018-010493, the contents of which are incorporated herein by reference.

FIELD

The present invention relates to an object conveying system.

BACKGROUND

In the related art, in the case in which work such as handling or the like is performed in accordance with the position and the orientation of a large object such as a vehicle body being conveyed by a conveyor, images of three known gauge marks provided on the object are individually captured by using three cameras, and the position and the orientation of the object are three-dimensionally measured from the positional relationship of the acquired three known gauge marks (for example, see Japanese Unexamined Patent Application, Publication No. Hei 7-13613).

SUMMARY

An aspect of the present invention is an object conveying system including: a conveying apparatus that conveys an object provided with three or more feature points that are disposed in known positional relationships with respect to each other; a camera that captures images of the individual feature points of the object being conveyed by the conveying apparatus; a position measuring portion that measures positions of the individual feature points from the images acquired by the camera; a detecting portion that detects the position of the object or a movement velocity thereof achieved by the conveying apparatus; a position correcting portion that corrects, on the basis of the position or the movement velocity detected by the detecting portion and differences in times at which the individual images were acquired by the camera, the positions of the individual feature points measured by the position measuring portion so as to achieve positions at which the feature points are disposed at the same time; a line-of-sight calculating portion that calculates lines of sight that pass through the individual feature points on the basis of the positions of the individual feature points corrected by the position correcting portion and the position of the camera; and a position calculating portion that calculates at least a three-dimensional position of the object by applying a polygon having a known shape, in which the positions of the individual feature points serve as apexes thereof, to the three or more lines of sight calculated by the line-of-sight calculating portion.

In the above-described aspect, the object may be provided with three of the feature points, and the position calculating portion may calculate the three-dimensional position and orientation of the object by applying a triangle, in which the positions of the individual feature points serve as the apexes thereof, to the three lines of sight calculated by the line-of-sight calculating portion.

In the above-described aspect, three of the cameras may be provided, and the individual cameras may be disposed at positions at which each one of the cameras can capture an image of a different one of the feature points.

The above-described aspect, may further include: a robot that is capable of moving the camera to a position at which it is possible to capture the images of the individual feature points.

In the above-described aspect, the detecting portion may be an encoder provided in the conveying apparatus.

In the above-described aspect, the detecting portion may detect a position or a movement velocity of the object on the basis of the images captured by the camera(s).

DETAILED DESCRIPTION

An object conveying system 1 according to an embodiment of the present invention will be described below with reference to the drawings.

Figure 1:
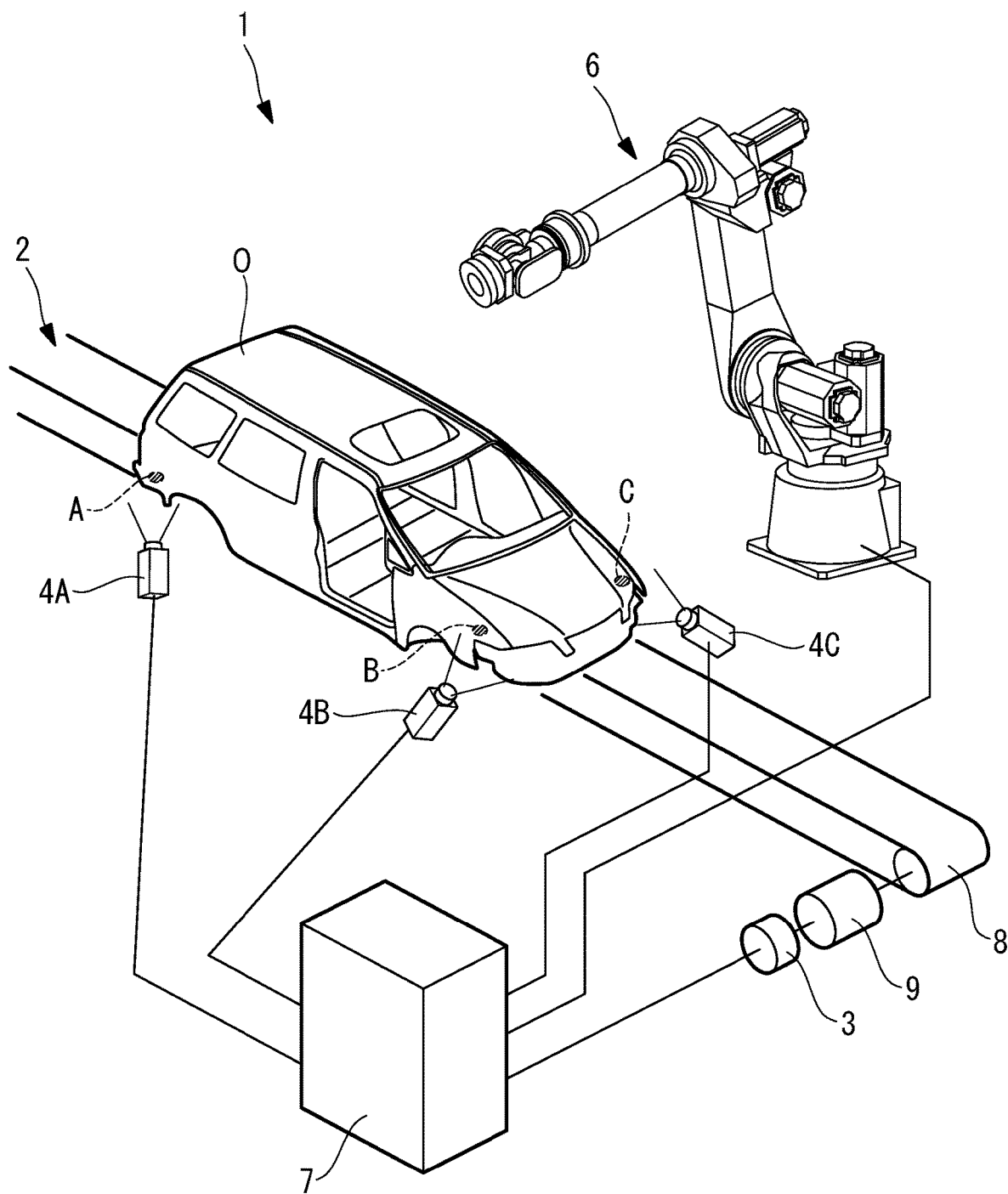
FIG. 1 is an overall configuration diagram showing an object conveying system according to an embodiment of the present invention.

As shown in FIG. 1, the object conveying system 1 according to this embodiment is provided with: a conveyor (conveying apparatus) 2 that conveys a vehicle body (object) O; an encoder (movement velocity detecting portion, detecting portion) 3 that is provided in the conveyor 2 and that detects a conveying velocity (movement velocity) of the vehicle body O being conveyed by the conveyor 2; three cameras 4A, 4B, and 4C that are installed in the vicinity of the conveyor 2 and that capture, from below the vehicle body O being conveyed by the conveyor 2, images of three circular holes (feature points) A, B, and C provided on a bottom surface of the vehicle body O; and a computation apparatus (see FIG. 2) 5 that calculates the position and the orientation of the vehicle body O by using the images acquired by the cameras 4A, 4B, and 4C and the conveying velocity detected by the encoder 3. The computation apparatus 5 is provided in, for example, a control apparatus 7 of a robot 6 that is installed near the conveyor 2 and that performs work on the vehicle body O.

The conveyor 2 is, for example, a belt conveyor and is provided with a belt 8 that conveys the vehicle body O placed thereon in one direction. The belt 8 is driven by a motor 9. The encoder 3 is provided in the motor 9 and detects a rotational angle of the motor 9.

As shown in FIG. 1, the three cameras 4A, 4B, and 4C are disposed at positions at which each of the three cameras can capture an image of one of the three circular holes A, B, and C at substantially the same time.

When the images are captured, the individual cameras 4A, 4B, and 4C output, together with the acquired images, information about the time at which the images were acquired.

Figure 2:
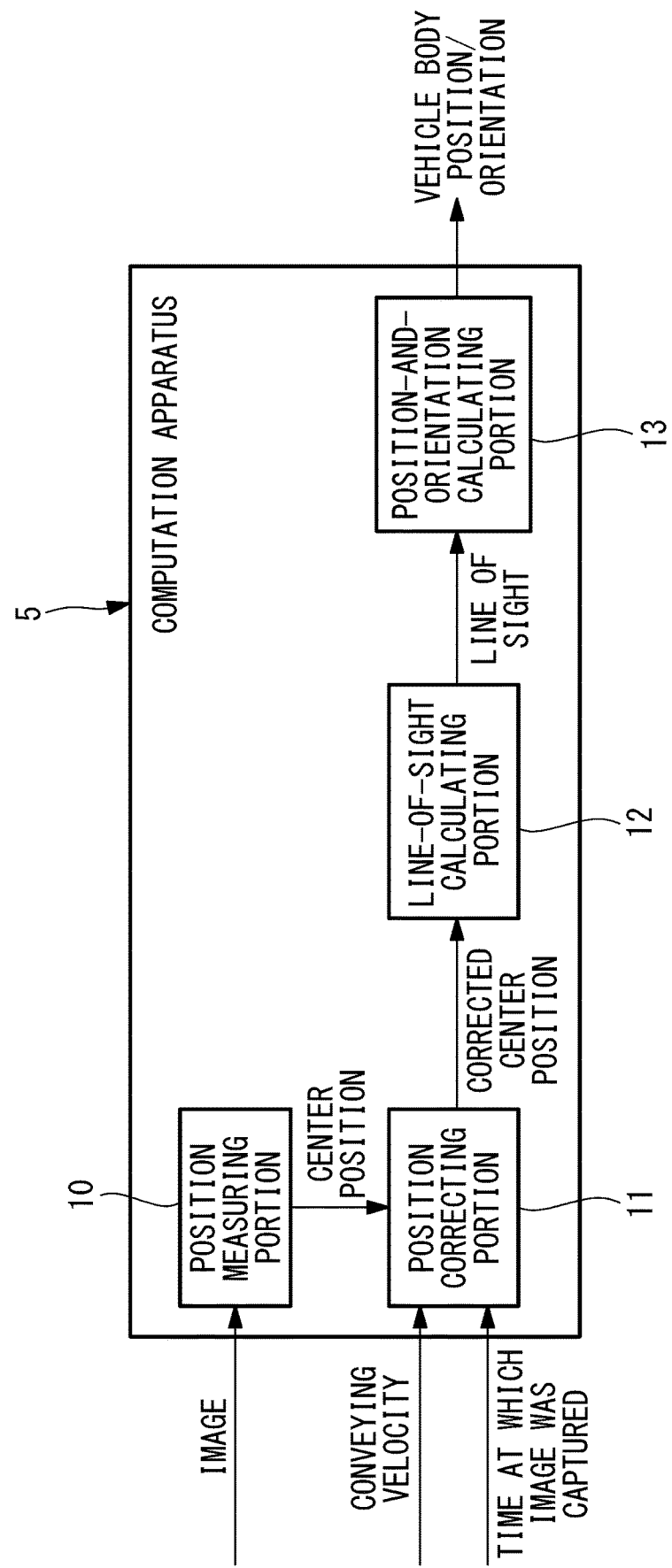
FIG. 2 is a block diagram showing a computation apparatus provided in the object conveying system in FIG. 1.

The computation apparatus 5 receives the conveying velocity detected by the encoder 3, the images acquired by the cameras 4A, 4B, and 4C, and the information about the time at which the images were acquired. As shown in FIG. 2, the computation apparatus 5 is provided with a position measuring portion 10 that measures center positions (see FIG. 3) $P_1$, $P_2$, and $P_3$ of the circular holes A, B, and C in the images by processing the images received from the cameras 4A, 4B, and 4C. The computation apparatus 5 is provided with a position correcting portion 11 that corrects the center positions $P_1$, $P_2$, and $P_3$ of the circular holes A, B, and C by using the center positions $P_1$, $P_2$, and $P_3$ of the circular holes A, B, and C measured by the position measuring portion 10, the conveying velocity received from the encoder 3, and the information about the time at which the images were acquired, received from the cameras 4A, 4B, and 4C.

More specifically, with reference to the center position $P_1$ of the circular hole A measured by the position measuring portion 10 in the image acquired by one camera (hereinafter also referred to as the reference camera) 4A, the position correcting portion 11 corrects the center positions $P_2$ and $P_3$ of the circular holes B and C individually measured by the position measuring portion 10 in the two images acquired by the other two cameras 4B and 4C.

In other words, because the vehicle body O is continuously moving, in the case in which there are differences between the time at which the image was captured by the reference camera 4A and the times at which the images were captured by the other two cameras 4B and 4C, the relative positions of the three circular holes A, B, and C detected from the images acquired by the three cameras 4A, 4B, and 4C differ from the relative positions of the circular holes A, B, and C provided on the vehicle body O in reality.

Therefore, the position correcting portion 11 calculates, from the information about the times at which the images received from the cameras 4A, 4B, and 4C were captured, the differences between the reference camera 4A and the other cameras 4B and 4C at the times at which the images were captured (time difference), and multiplies the calculated time differences by the conveying velocity received from the encoder 3, thereby calculating amounts of movement achieved within this time difference. Then, the position correcting portion 11 adds the calculated amounts of movement to the center positions $P_2$ and $P_3$ of the circular holes B and C measured from the images acquired by the other cameras 4B and 4C. By doing so, it is possible to correct the center positions $P_2$ and $P_3$ of the circular holes B and C measured from the images acquired by the other cameras 4B and 4C so as to achieve the position at which the circular hole A was disposed at the time at which the image thereof was acquired by the reference camera 4A.

The computation apparatus 5 is provided with: a line-of-sight calculating portion 12 that calculates lines of sight a, b, and c that connect the corrected center positions $P_1$, $P_2$, and $P_3$ of the individual circular holes A, B, and C and center positions $P_1$, $P_2$, and $P_3$ of the individual cameras 4A, 4B, and 4C, for example, center positions of distal-end lenses thereof; and a position-and-orientation calculating portion (position calculating portion) 13 that calculates the position and the orientation of the vehicle body O by applying individual apexes of a triangle having a known shape to the three calculated lines of sight a, b, and c.

The three cameras 4A, 4B, and 4C are disposed pointing directions in which, among the three lines of sight a, b, and c, any two of the lines of sight a, b, and c are not close to being parallel to each other, and angles formed between the lines of sight a, b, and c are preferably 60° or greater.

Here, applying the individual apexes of the triangle to the three lines of sight a, b, and c means that the triangle is disposed so that every one of the three apexes of the triangle having the known shape are disposed on one of the lines of sight a, b, and c. The triangle to be applied is, for example, a triangle in which the center positions $P_1$, $P_2$, and $P_3$ of the three circular holes A, B, and C are connected when the vehicle body O is disposed at a predetermined angle, for example, so as to be horizontally disposed, and such a triangle may be applied as is, or a triangle that is similar thereto in shape may be applied.

Figure 3:
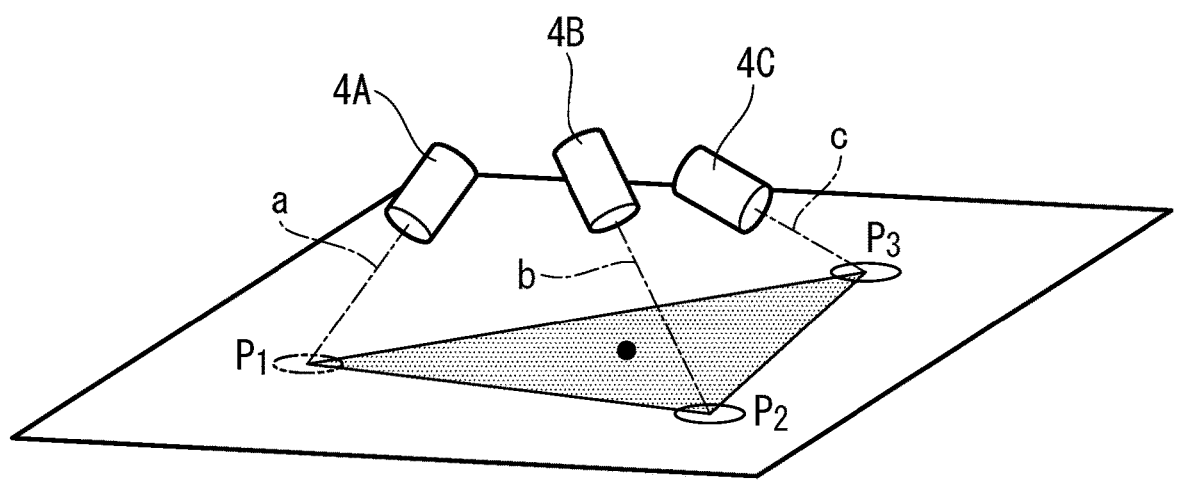
FIG. 3 is a diagram showing a state in which a triangle having a known shape is applied to lines of sight of cameras that capture images of circular holes on a vehicle body that is horizontally disposed in the object conveying system in FIG. 1.
Figure 4:
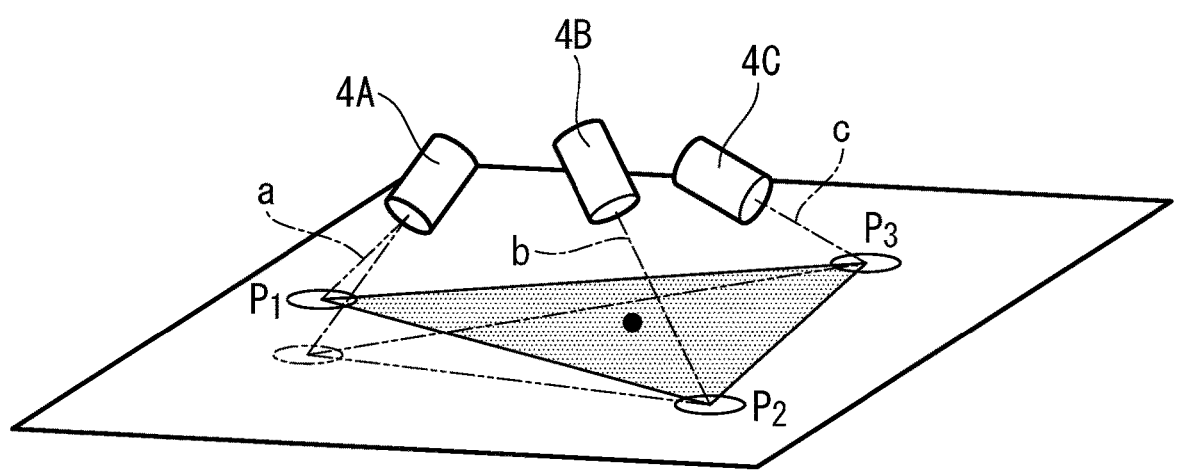
FIG. 4 is a diagram showing a state in which the triangle having the known shape is applied to the lines of sight of the cameras that capture the images of the circular holes on the vehicle body that is disposed in an inclined manner with respect to the horizontal position in the object conveying system in FIG. 1.

When the triangle in which the center positions $P_1$, $P_2$, and $P_3$ of the three circular holes A, B, and C are connected is applied as is, if the vehicle body O is horizontally disposed, the three apexes of the applied triangle are aligned with the center positions $P_1$, $P_2$, and $P_3$ of the three circular holes A, B, and C, as shown in FIG. 3. On the other hand, in the case in which the vehicle body O is inclined, because the calculated lines of sight a, b, and c are different as compared with those of the case in which the vehicle body O is horizontally disposed, the inclination of the triangle to be applied to the lines of sight a, b, and c changes, as shown in FIG. 4. In other words, it is possible to calculate the position of the vehicle O by calculating the position of the applied triangle, for example, the center of gravity thereof, and it is possible to calculate the orientation of the vehicle body O by calculating the inclination of the applied triangle.

As has been described above, with the object conveying system 1 according to this embodiment, it is possible to determine the three lines of sight a, b, and c from the three images acquired on the basis of the positions of the three circular holes A, B, and C provided on the vehicle body O and the positions of the three cameras 4A, 4B, and 4C, and it is possible to calculate the position and the orientation of the vehicle body O from the center of gravity and the angle of the triangle having the known shape that is applied to the determined three lines of sight a, b, and c. Because, by being corrected by means of the position correcting portion 11, the positions used as the positions of the three circular holes A, B, and C in this case are equivalent to the positions at which the three circular holes A, B, and C are disposed at the same time, there is an advantage in that it is possible to precisely measure the three-dimensional position and orientation of the vehicle body O while moving the vehicle body O by means of the conveyor 2, even if the times at which the images were acquired by the three cameras 4A, 4B, and 4C do not strictly coincide with each other.

In other words, even in the case in which the images of the three circular holes A, B, and C are captured by synchronizing the three cameras 4A, 4B, and 4C, there are cases in which it is difficult to make the times at which the images are captured by the three cameras 4A, 4B, and 4C strictly coincide with each other due to delays in propagation of image-capturing instruction signals, individual differences among the cameras 4A, 4B, and 4C, etc. Even in such a case, because the measured center positions $P_1$, $P_2$, and $P_3$ of the circular holes A, B, and C are corrected in accordance with the time differences in the times at which the images were captured, it is possible to precisely measure the three-dimensional position and orientation of the vehicle body O.

Also, with the object conveying system 1 according to this embodiment, by using a triangle, which is a polygon with the least number of apexes, as the polygon to be applied, it is possible to precisely measure, in real time, the three-dimensional position and orientation of the vehicle body O with a relatively small amount of calculation.

For example, in the case in which a robot 6 is disposed in the vicinity of the conveyor 2 and work is performed on the vehicle body O by disposing, by tracking and controlling, by means of the computation apparatus 5, the robot 6 in accordance with the precisely measured three-dimensional position and orientation of the vehicle body O, there is no need to stop the conveyor 2, and thus, there is an advantage in that it is possible to enhance the productivity by preventing a reduction in the work efficiency.

In this embodiment, because the three lines of sight a, b, and c that are formed between the individual cameras 4A, 4B, and 4C and the center positions $P_1$, $P_2$, and $P_3$ of the circular holes A, B, and C are disposed so as to form angles of 60° or greater, it is possible to uniquely apply the triangle. In other words, it is possible to precisely apply the triangle having the known shape to the three lines of sight a, b, and c, and thus, there is an advantage in that it is possible to precisely measure the position and the orientation of the vehicle body O.

Note that, in this embodiment, although the center positions $P_1$, $P_2$, and $P_3$ of the circular holes A, B, and C have been described as examples of the feature points, alternatively, other arbitrary feature points may be employed. Although the three lines of sight a, b, and c based on the center positions $P_1$, $P_2$, and $P_3$ of the three circular holes A, B, and C are calculated and the triangle is applied thereto, four or more feature points may be measured, and a rectangle or a polygon having a greater number of apexes may be applied thereto.

Figures 5, 6:
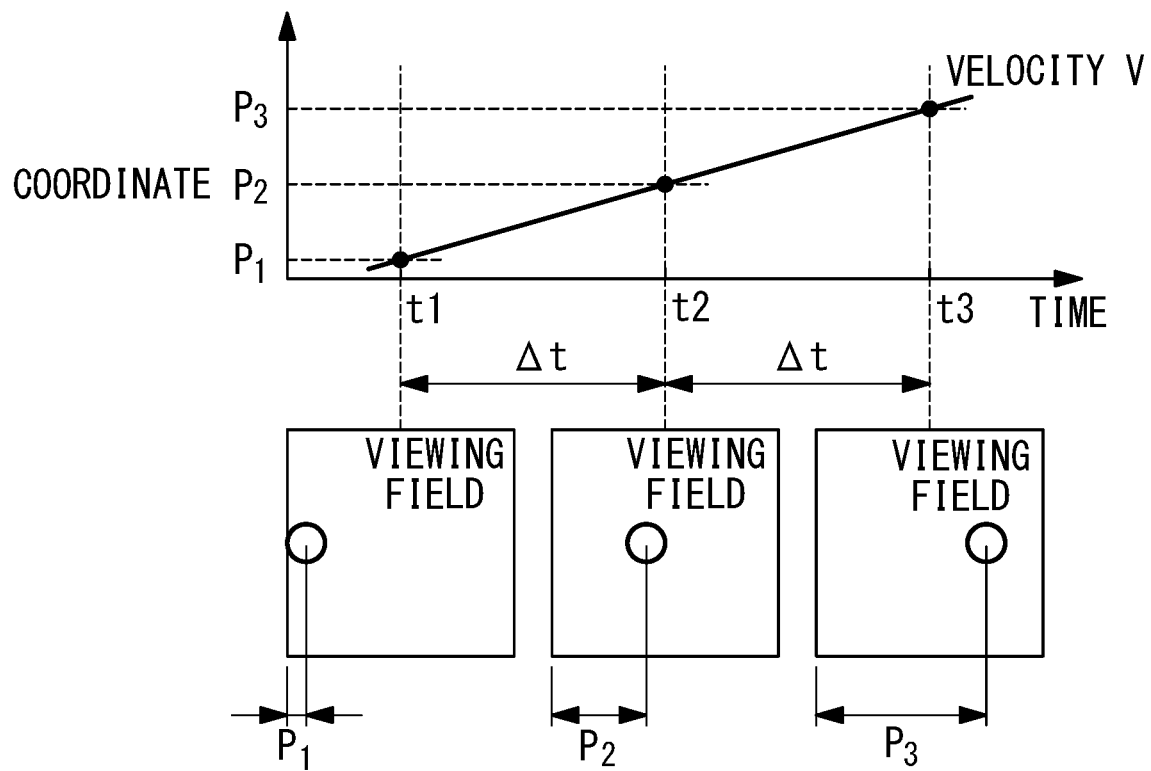
FIG. 5 is a diagram showing a modification of the object conveying system in FIG. 1, which shows an example database in which delay times at times at which the images were captured by the individual cameras are stored.
FIG. 6 is a diagram showing another modification of the object conveying system in FIG. 1, which shows a diagram for explaining a case in which the conveying velocity of the vehicle body is determined from images.

In this embodiment, the information about the times at which the images were captured is received from the three cameras 4A, 4B, and 4C, the time differences between the times at which the images were captured by the cameras 4A, 4B, and 4C are calculated, and the calculated differences are used when performing position correction. Alternatively, as shown in FIG. 5, time differences $\Delta t_1$ and $\Delta t_2$ between the times at which the images were captured by the individual cameras 4A, 4B, and 4C may be measured in advance, for example, at the time of installation of the system or the like, and may be stored in a database. By doing so, it is possible to perform position correction in a simple manner by referring to the database without receiving, from the cameras 4A, 4B, and 4C, the information about the times at which the images were captured.

In this embodiment, although the conveying velocity of the vehicle body O, which is the object, is detected by the encoder 3 provided in the motor 9 that drives the conveyor 2, alternatively, the conveying velocity may be calculated, without using the encoder 3, by processing the images acquired by the cameras 4A, 4B, and 4C.

For example, as shown in FIG. 6, when three images are acquired, by using at least one of the above-described three cameras 4A, 4B, and 4C, in the same viewing field at different times t1, t2, and t3, with a predetermined time interval $\Delta t$ there between, in the individual images, the circular holes A, B, and C included in the images are recognized, and the center positions $P_1$, $P_2$, and $P_3$ of the recognized circular holes A, B, and C are calculated.

Then, a conveying velocity V is calculated by dividing, by the time interval $\Delta t$ for image capturing, differences between the center positions $P_1$, $P_2$, and $P_3$ of the circular holes A, B, and C in the images that were acquired adjacent to each other in the time-axis direction and the center positions $P_1$, $P_2$, and $P_3$ in the conveying direction. In the case in which the conveying velocity V is calculated multiple times for the same circular holes A, B, and C, an average value thereof or a value fitted by using the least squares method or the like should be output as the conveying velocity V.

If the circular holes A, B, and C are not detected temporarily, the conveying velocity V calculated immediately before this period may be continued to be output.

In this embodiment, the three cameras 4A, 4B, and 4C are secured in the vicinity of the conveyor 2, and each one of the cameras 4A, 4B, and 4C captures the image of any of one of the circular holes A, B, and C. Alternatively, a camera (hand camera) may be mounted on a wrist of the robot 6 that is disposed in the vicinity of the conveyor 2 and that performs work on the vehicle body O, the camera mounted on the wrist may be moved by actuating the robot 6, and thus, three images in which the three circular holes A, B, and C are captured at different times may be acquired.

In this case also, because the center positions $P_1$, $P_2$, and $P_3$ of the circular holes A, B, and C measured from the three images are corrected so as to be equivalent to the positions at which the images of the three circular holes A, B, and C are captured at the same time, it is possible to precisely measure the position and the orientation of the vehicle body O.

The images may be captured by mounting a single camera or a plurality of cameras 4A, 4B, and 4C on a robot that is separate from the robot 6 that performs work on the vehicle body O.

In this embodiment, although the vehicle body O has been described as an example of the object, there is no limitation thereto, and the object conveying system 1 according to the present invention may be employed when precisely measuring the position and the orientation of another arbitrary object while conveying the object by means of the conveyor 2.

Figure 7:
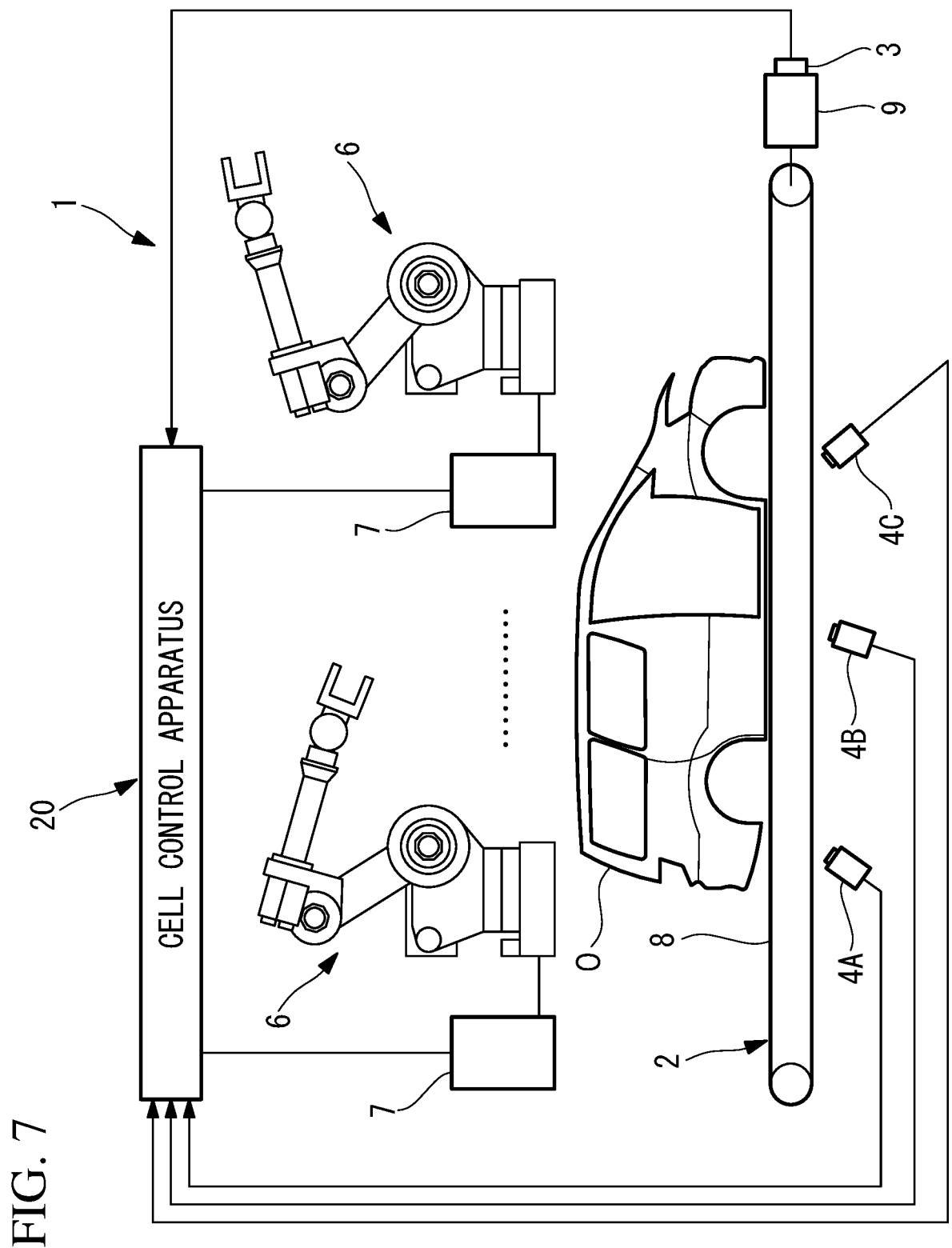
FIG. 7 is a schematic diagram showing another modification of the object conveying system in FIG. 1, which is a schematic diagram for explaining a case in which control apparatuses of a plurality of robots are connected to a cell control apparatus.

In this embodiment, a case in which the computation apparatus 5 is provided in the control apparatus 7 of the robot 6 has been described. Alternatively, as shown in FIG. 7, in the case in which a plurality of robots 6 perform work on the same vehicle body O, a cell control apparatus 20 to which the control apparatuses 7 of the individual robots 6 are connected may be provided, and the cell control apparatus 20 may be provided with the computation apparatus 5. If the outputs from the cameras 4A, 4B, and 4C and the encoder 3 are input to the cell control apparatus 20, and the position and the orientation of the vehicle body O are measured in the cell control apparatus 20, it is possible to continue measuring the position and the orientation of the vehicle body O to be utilized by the other robots 6 even if the power of one of the robots 6 is temporarily turned off for maintenance or the like.

As a result, the following aspect is derived from the above described embodiment.

An aspect of the present invention is an object conveying system including: a conveying apparatus that conveys an object provided with three or more feature points that are disposed in known positional relationships with respect to each other; a camera that captures images of the individual feature points of the object being conveyed by the conveying apparatus; a position measuring portion that measures positions of the individual feature points from the images acquired by the camera; a detecting portion that detects the position of the object or a movement velocity thereof achieved by the conveying apparatus; a position correcting portion that corrects, on the basis of the position or the movement velocity detected by the detecting portion and differences in times at which the individual images were acquired by the camera, the positions of the individual feature points measured by the position measuring portion so as to achieve positions at which the feature points are disposed at the same time; a line-of-sight calculating portion that calculates lines of sight that pass through the individual feature points on the basis of the positions of the individual feature points corrected by the position correcting portion and the position of the camera; and a position calculating portion that calculates at least a three-dimensional position of the object by applying a polygon having a known shape, in which the positions of the individual feature points serve as apexes thereof, to the three or more lines of sight calculated by the line-of-sight calculating portion.

With this aspect, when the object is conveyed by the conveying apparatus, the camera captures images of the three or more feature points provided on the object, and the position measuring portion measures the positions of the individual feature points from the acquired images. The detecting portion detects the position or the movement velocity of the object achieved by the conveying apparatus, and the positions of the feature points measured by the position measuring portion are corrected, on the basis of the differences in the times at which the individual images were acquired by the camera and the position or the movement velocity, so as to achieve positions at which the feature points are disposed at the same time.

The line-of-sight calculating portion calculates, on the basis of the corrected positions of the individual feature points and the position of the camera, the lines of sight that pass through the individual feature points. Then, the position calculating portion applies the polygon, in which the positions of the individual feature points serve as the apexes thereof, to the three or more feature points calculated by the line-of-sight calculating portion, and thereby, it is possible to calculate the position of the object on the basis of the position of the polygon.

In other words, because the positions of the three or more feature points calculated from the images are corrected so as to achieve the positions at which the feature points are disposed at the same time, it is possible to three-dimensionally measure at least the position of the object while moving the object without stopping the conveying apparatus, even if the images including the individual feature points were acquired at different times while moving the object.

In the above-described aspect, the object may be provided with three of the feature points, and the position calculating portion may calculate the three-dimensional position and orientation of the object by applying a triangle, in which the positions of the individual feature points serve as the apexes thereof, to the three lines of sight calculated by the line-of-sight calculating portion.

By employing this configuration, the line-of-sight calculating portion calculates the three lines of sight on the basis of the positions of the three feature points corrected by the position correcting portion and the position of the camera, and the position calculating portion applies the triangle to the three lines of sight. On the basis of the position and inclination of the applied triangle, it is possible to calculate the position and the orientation of the object being conveyed by the conveying apparatus.

By using a triangle, which is a polygon that has a minimum number of apexes required to calculate the position and the inclination, it is possible to calculate the three-dimensional position and orientation of the object, in real time, by reducing the computation time.

In the above-described aspect, three of the cameras may be provided, and the individual cameras may be disposed at positions at which each one of the cameras can capture an image of a different one of the feature points.

By employing this configuration, by capturing the images of the three different feature points by using the three cameras, it is possible to acquire the images for calculating the position and the orientation of the object with a smaller amount of time.

The above-described aspect, may further include: a robot that is capable of moving the camera to a position at which it is possible to capture the images of the individual feature points.

By employing this configuration, it is possible to capture the images of the individual feature points by moving the camera by actuating the robot, and thus, it is possible to reduce the required number of cameras.

In the above-described aspect, the detecting portion may be an encoder provided in the conveying apparatus.

By employing this configuration, by using the movement velocity of the object achieved by the conveying apparatus detected by the encoder, it is possible to correct the positions of the individual feature points in a simple, precise manner.

In the above-described aspect, the detecting portion may detect a position or a movement velocity of the object on the basis of the images captured by the camera(s).

By employing this configuration, it is not necessary to provide a special sensor for detecting the movement velocity of the object achieved by the conveying apparatus, and it is possible to correct the positions of the individual feature points by also detecting the movement velocity of the object by means of the camera for detecting the position and the orientation of the object.

REFERENCE SIGNS LIST 1 object conveying system
2 conveyor (conveying apparatus)
3 encoder (movement velocity detecting portion, detecting portion)
4A, 4B, 4C camera
6 robot
10 position measuring portion
11 position correcting portion
12 line-of-sight calculating portion
13 position-and-orientation calculating portion (position calculating portion)
A, B, C circular hole (feature point)
O vehicle body (object)
V conveying velocity (movement velocity)

The invention claimed is:
1. An object conveying system comprising:
a conveying apparatus that conveys an object provided with three or more feature points that are disposed in known positional relationships with respect to each other;
a camera that captures images of the individual feature points of the object being conveyed by the conveying apparatus;

a position measuring portion that measures positions of the individual feature points from the images acquired by the camera;

a detecting portion that detects the position of the object or a movement velocity thereof achieved by the conveying apparatus;

a position correcting portion that corrects, on the basis of the position or the movement velocity detected by the detecting portion and differences in times at which the individual images were acquired by the camera, the positions of the individual feature points measured by the position measuring portion so as to achieve positions at which the feature points are disposed at the same time;

a line-of-sight calculating portion that calculates lines of sight that pass through the individual feature points on the basis of the positions of the individual feature points corrected by the position correcting portion and the position of the camera; and a position calculating portion that calculates at least a three-dimensional position of the object by applying a polygon having a known shape, in which the positions of the individual feature points serve as apexes thereof, to the three or more lines of sight calculated by the line-of-sight calculating portion.

2. The object conveying system according to claim 1,
wherein the object is provided with three of the feature points, and
the position calculating portion calculates the three-dimensional position and orientation of the object by applying a triangle, in which the positions of the individual feature points serve as the apexes thereof, to the three lines of sight calculated by the line-of-sight calculating portion.

3. The object conveying system according to claim 2,
wherein three of the cameras are provided, and
each of the three individual cameras are disposed at positions at which each one of the three individual cameras can capture an image of a different one of the feature points.

4. The object conveying system according to claim 1, further comprising:
a robot that is capable of moving the camera to a position at which it is possible to capture the images of the individual feature points.

5. The object conveying system according to claim 1, wherein the detecting portion is an encoder provided in the conveying apparatus.

6. The object conveying system according to claim 1, wherein the detecting portion detects a position or a movement velocity of the object on the basis of the images captured by the camera.

* * * * *